US008311690B2

(12) United States Patent
Tanaka (10) Patent No.: US 8,311,690 B2
(45) Date of Patent: Nov. 13, 2012

(54) CHARGING SYSTEM FOR VEHICLES

(75) Inventor: Yasuhiro Tanaka, Kariya (JP)

(73) Assignee: Denso Corporation, Kariya (JP)

( * ) Notice: Subject to any disclaimer, the term of this patent is extended or adjusted under 35 U.S.C. 154(b) by 990 days.

(21) Appl. No.: 12/237,643

(22) Filed: Sep. 25, 2008

(65) Prior Publication Data

US 2009/0082916 A1 Mar. 26, 2009

(30) Foreign Application Priority Data

Sep. 25, 2007 (JP) ................................. 2007-247892

(51) Int. Cl.
| | |
|---|---|
| *B60L 1/00* | (2006.01) |
| *B60L 3/00* | (2006.01) |
| *H01H 47/00* | (2006.01) |
| *B60K 1/00* | (2006.01) |
| *B60R 25/00* | (2006.01) |
| *G06F 17/00* | (2006.01) |

(52) U.S. Cl. .............. 701/22; 701/36; 701/49; 340/428; 180/65.1; 307/10.1; 307/10.5

(58) Field of Classification Search ................ 701/1, 22, 701/29, 36, 49, 29.1, 31.5, 32.7, 33.4, 31.4, 701/33.2, 34.2; 340/901, 426.1, 428, 438; 180/65.1, 65.21, 65.27, 65.29; 307/9.1, 10.1, 307/10.2, 10.3, 10.4, 10.7
See application file for complete search history.

(56) References Cited

U.S. PATENT DOCUMENTS

| | | | | |
|---|---|---|---|---|
| 5,008,603 | A | * | 4/1991 | Nakayama et al. ........ 318/568.1 |
| 5,580,260 | A | | 12/1996 | Flieger et al. |
| 5,627,448 | A | * | 5/1997 | Okada et al. ................... 439/133 |
| 5,711,558 | A | * | 1/1998 | Woody ........................... 292/335 |
| 5,934,918 | A | * | 8/1999 | Wuechner ..................... 439/133 |
| 7,791,217 | B2 | * | 9/2010 | Kamaga ........................ 307/9.1 |
| 2009/0057041 | A1 | * | 3/2009 | Kamaga ....................... 180/65.2 |
| 2009/0286414 | A1 | * | 11/2009 | Ohtomo ........................ 439/299 |
| 2010/0013433 | A1 | * | 1/2010 | Baxter et al. ................. 320/109 |
| 2010/0228405 | A1 | * | 9/2010 | Morgal et al. ..................... 701/2 |
| 2010/0320964 | A1 | * | 12/2010 | Lathrop et al. ............... 320/109 |

FOREIGN PATENT DOCUMENTS

| | | |
|---|---|---|
| JP | 10-262303 | 9/1998 |
| JP | 2006-1480 | 1/2006 |
| JP | 2007-236172 | 9/2007 |

* cited by examiner

*Primary Examiner* — Thomas Tarcza
*Assistant Examiner* — Edward Pipala
(74) *Attorney, Agent, or Firm* — Nixon & Vanderhye, P.C.

(57) ABSTRACT

A charging system provided for vehicles prevents theft of a charging cable, insertion of foreign matter into a vehicle-side receptacle, or tampering when an onboard battery usable for running power is charged from a household power supply. A cable connector of the charging cable is opposed to the vehicle-side receptacle in a connecting part to prepare for charging. When a PHV is exited, a switching command switching from an unlocked state of a door locking mechanism to a locked state is inputted to a PHV ECU responsive to an inputting manipulation performed on a key or door key sensor. The PHV ECU allows the door locking mechanism to switch from the unlocked state to the locked state. The PHV ECU allows locking mechanisms to switch from the unlocked states to the locked states in the manner interlocked with the switching action of the door locking mechanism.

13 Claims, 6 Drawing Sheets

CHARGING SYSTEM FOR VEHICLES

CROSS REFERENCE TO RELATED APPLICATIONS

The present application is based on and claims priority to Japanese Application No. 2007-247892 filed Sep. 25, 2007, the entire contents of which are incorporated herein by reference.

BACKGROUND OF THE INVENTION

1. Field of the Invention

The present invention relates to a charging system for vehicles and, more specifically, to using an onboard battery for running power.

2. Description of the Related Art

In recent years, electric vehicles (EVs) and hybrid vehicles (HVs) capable of using an onboard battery for running power have attracted attention from the viewpoint of protection of the global environment through reduction in a carbon-dioxide ($CO^2$) emission, and have been used in practice. Recently, development is under way of a plug-in hybrid vehicle (PHV) whose battery can be charged not only with the rotation of an engine made while the vehicle is running, but from a household power supply or the like at night or during vehicle down-time while the vehicle is not running. As PHVs gain popularity, facilities for charging the onboard battery will be treated more and more seriously.

In relation to rental cars that use battery power for a purpose other than running, a technology using a locking mechanism that locks the connection of a charging cord or charging cable to a charging socket of a vehicle or vehicle-side receptacle, and an IC card for a rental car to prevent the charging cord from coming off during charging and also prevent the use of a charging system by others has been proposed in JP-A-10-262303.

According to JP-A-10-262303, an identification code assigned to the IC card can be used to prevent the breakage of the charging cord and the unauthorized use of the charging system. However, assuming that the PHV and others prevail as private cars, and nighttime charging to be performed using the household power supply becomes a matter of common practice, such an incident that the charging cord is stolen, a foreign matter or the like is inserted into the charging socket, or any other component is tampered may presumably take place. If a dedicated IC card is employed in order to prevent the incident, an owner of a vehicle or an occupant would have to perform a complex manipulation and incur an extra cost.

SUMMARY OF THE INVENTION

The present invention is intended to provide a charging system for vehicles that can prevent an incident such as theft of a charging cable, insertion of a foreign matter into a vehicle-side receptacle, or tampering with any other component, and that can be provided with such a security feature without the necessity of a time-consuming manipulation or a complex construction, even when an onboard battery, usable for running power, is charged from a household power supply at night or during vehicle down-time.

A charging system is thereby provided for vehicles in accordance with various exemplary aspects. A charging system for vehicles capable of using an onboard battery for running power includes a door locking mechanism that acts to switch from a locked state in which the door of a vehicle for boarding is closed and locked, to an unlocked state, in which the door for boarding is unlocked and vice versa, a charging locking mechanism that when the onboard battery and an ac power supply are connected to each other over a charging cable, acts to switch from a locked state, in which the charging cable is attached to or held in a vehicle-side receptacle in order to enable charging, to an unlocked state, in which the charging cable is detached from the vehicle-side receptacle in order to suspend charging, or vice versa, and an interlocked locking control means that when an occupant leaves the vehicle, allows the charging locking mechanism to act to switch from the unlocked state to the locked state in response to a switching command of switching from the unlocked state of the door locking mechanism to the locked state thereof, and that when the occupant boards the vehicle, allows the charging locking mechanism to act to switch from the locked state to the unlocked state in response to a switching command of switching from the locked state of the door locking mechanism to the unlocked state thereof.

According to the charging system for vehicles, when an occupant leaves a vehicle, the switching action of the charging locking mechanism to the locked state is performed while being interlocked with the switching command of switching to the unlocked state of the door locking mechanism, for example, with a manipulation of locking the door locking mechanism using a key. Moreover, when the occupant boards the vehicle, the switching action of the charging locking mechanism to the unlocked state is performed while being interlocked with the switching command of switching to the unlocked state of the door locking mechanism, for example, with a manipulation of unlocking the door locking mechanism using the key. Thus, the interlocked locking control means controls interlock of the switching action of the charging locking mechanism between locking or the locked state and unlocking or the unlocked state in response to the switching command of switching the locking or locked state of the door locking mechanism and the unlocking or unlocked state thereof according to the positional relationship between the occupant and vehicle. Consequently, even when the onboard battery usable for running power is charged from a household power supply at night or during vehicle down-time, an incident such as theft of the charging cable, insertion of foreign matter into the vehicle-side receptacle, or tampering with any other component can be prevented. Moreover, the switching action of the charging locking mechanism between the locking and unlocking state is performed in response to the switching command of switching the locking of the door locking mechanism and the unlocking thereof normally issued from the occupant to the vehicle. Consequently, the above described security feature can be provided without the necessity of a time-consuming manipulation or a complex construction.

Aspects of the invention are suitable for PHVs but can be applied to HVs and EVs. The typical example of the switching command of switching of the door locking mechanism is the manipulation of switching the door locking mechanism from one state to another using a key. The key may not only be a mechanical key but also be an electronic key called an intelligent key or a smart key or bidirectional handheld equipment including portable cellular phones. The door locking mechanism preferably includes a power lock structure such as a door locking motor. Further, the charging cable linking the onboard battery and ac power supply may be of a bilateral connector type having a connector that is coupled or inserted into a receptacle, on both the ends thereof, or of a unilateral connector type having the connector, which is coupled to a receptacle, on one of the ends thereof on the vehicle side.

In the charging system for vehicles, the charging locking mechanism includes a connector locking mechanism that acts to switch from a locked state in which the cable connector of the charging cable is inserted into or held in the vehicle-side receptacle to an unlocked state, in which the cable connector can be pulled out of the vehicle-side receptacle, or vice versa, and a cover locking mechanism that acts to switch from an unlocked state in which a receptacle cover externally shielding the vehicle-side receptacle is closed and locked to an unlocked state, in which the receptacle cover is unlocked, or vice versa.

When the occupant leaves the vehicle, the interlocked locking control means allows at least one of the connector locking mechanism and cover locking mechanism to act to switch from the unlocked state to the locked state in response to the switching command of switching from the unlocked state of the door locking mechanism to the locked state thereof.

Otherwise, in the charging system for vehicles, the charging locking mechanism includes a connector locking mechanism that acts to switch from a locked state, in which the cable connector of the charging cable is inserted into or held in the vehicle-side receptacle, to an unlocked state, in which the cable connector can be pulled out of the vehicle-side receptacle, or vice versa, and a cover locking mechanism that acts to switch from an unlocked state in which a receptacle cover externally shielding the vehicle-side receptacle is closed and locked to an unlocked state, in which the receptacle cover is unlocked, or vice versa.

When the occupant boards the vehicle, the interlocked locking control means allows at least one of the connector locking mechanism and cover locking mechanism to act to switch from the locked state to the unlocked state in response to the switching command of switching from the locked state of the door locking mechanism to the unlocked state thereof.

The foregoing portions of the interlocked locking control means control interlock of the switching action of at least one of the connector locking mechanism and cover locking mechanism between locking and unlocking in response to the switching command of switching locking of the door locking mechanism and unlocking thereof according to the positional relationship between the occupant and the vehicle. Consequently, theft of the charging cable, insertion of foreign matter into the vehicle-side receptacle, or tampering with any other component can be properly prevented. Moreover, the switching action of the connector locking mechanism or cover locking mechanism between the locking and unlocking is performed in the same direction as the direction from the occupant to the vehicle in which the switching command of switching the locking of the door locking mechanism and the unlocking thereof is normally issued. Consequently, such a security feature can be readily provided without the necessity of a time-consuming manipulation or a complex construction.

The connector locking mechanism and cover locking mechanism can, similar to the door locking mechanism, include a power lock structure such as a connector locking motor or a cover locking motor.

In the above described charging systems for vehicles, the interlocked locking control means includes a door locking command input means that is manipulated in order to manually input the switching command of switching between the locked state and the unlocked state of the door locking mechanism.

When the door locking command input means is used to input an initial command which instructs the door locking mechanism to switch from the locked state to the unlocked state or vice versa, the interlocked locking control means allows the door locking mechanism alone to perform the switching action. When the door locking command input means is used to input a successive command that has the same contents as the initial command, the interlocked locking control means allows at least one of the connector locking mechanism and cover locking mechanism to perform the switching action. Thus, the switching action of the door locking mechanism and the switching action of the connector locking mechanism and/or cover locking mechanism may be implemented in a stepwise manner.

In the above described charging system, the interlocked locking control means includes a door locking command input means that is manipulated in order to manually input the switching command of switching between the locked state and the unlocked state of the door locking mechanism.

When the door locking command input means is used to input a command instructing the door locking mechanism to switch from the locked state to the unlocked state or vice versa, the command persisting for a predetermined time or less, the interlocked locking control means allows the door locking mechanism alone to perform the switching action. When the door locking command input means is used to input a command that persists for a time longer than the predetermined time, the interlocked locking control means allows at least one of the connector locking mechanism and cover locking mechanism to perform the switching action. Thus, the switching action of the door locking mechanism and the switching action of the connector locking mechanism and/or cover locking mechanism may be implemented in a stepwise manner.

In the above described sections of an exemplary interlocked locking control means, the interlock of the sections with the switching action of the connector locking mechanism or cover locking mechanism between locking and unlocking is controlled stepwise according to the number of times the switching command of switching the locking of the door locking mechanism and the unlocking thereof is issued through the manipulation of the door locking command input means, or the manipulation time of the door locking command input means. Consequently, the occupant can perform the next inputting manipulation on the door locking command input means while checking the progress of the switching action of the door locking mechanism, connector locking mechanism, or cover locking mechanism in a stepwise manner. Consequently, an incorrect action of any of the mechanisms can be discovered in an early stage and damage can be prevented.

A typical example of the door locking command input means is a key that is manipulated in order to input the switching command of switching of the door locking mechanism. A mechanical key, an electronic key, or bidirectional handheld equipment can be considered as an exemple of such means.

Further, the above described sections of interlocked locking control means may include a selective input means used externally to selectively input a first control mode in which an interlocking of the switching action of the door locking mechanism with the switching action of the connector locking mechanism and/or cover locking mechanism is controlled at a specified time in response to the switching command that is inputted using the door locking command input means, and a second control mode in which the interlocking is controlled in a stepwise manner in response to the switching command inputted using the door locking command input means.

The first control mode in which interlock of the switching action of the connector locking mechanism or cover locking mechanism is controlled in response to the switching command inputted for the first time using the door locking command input means, or the second control mode in which the interlock of the switching action of the connector locking mechanism or cover locking mechanism is controlled in a stepwise manner in response to the switching command inputted multiple times using the door locking command input means can be selected in order to intensify a security feature according to the situation in which the charging system is disposed.

Specifically, if the number of times by which the door locking command input means is manipulated, a manipulation time, and the relationship of interlock of or the timing of interlocking the switching action of each of the connector locking mechanism and cover locking mechanism are designated through selective input to be achieved using the selective input means, the charging system can be constructed in line with the wishes of an occupant, that is, can be customized.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF THE EXEMPLARY EMBODIMENTS

First Embodiment

Figure 1:
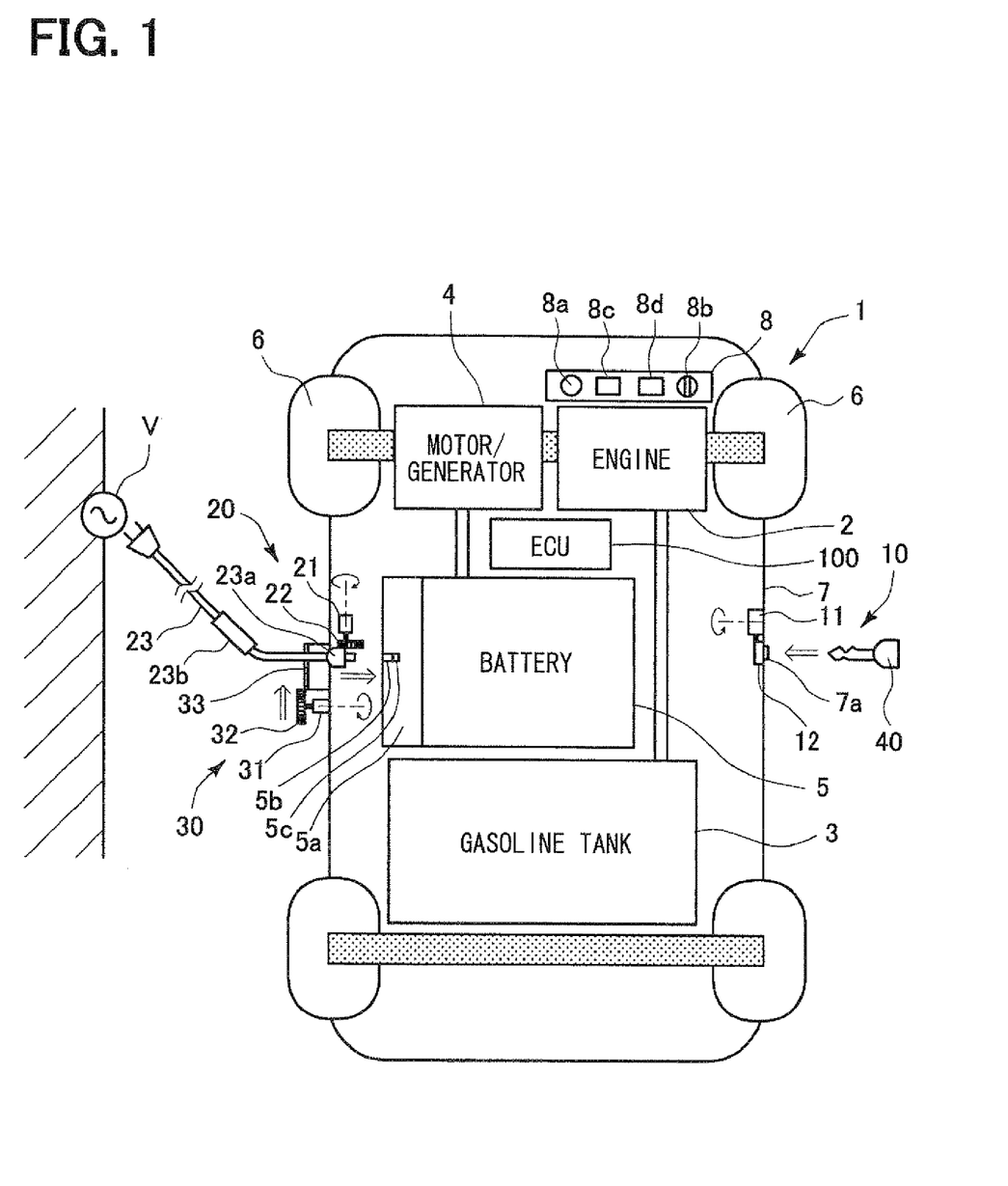
FIG. 1 is a schematic diagram illustrating an exemplary plug-in hybrid vehicle (PHV) including a charging system in accordance with an embodiment.

Embodiments of the invention will be described below with reference to examples shown in the drawings. FIG. 1 shows an example of a plug-in hybrid vehicle (PHV) including a charging system in accordance with an embodiment. The PHV 1 shown in FIG. 1 can use an onboard battery 5 as a source of running power for driving wheels 6. In other words, when the PHV 1 is started or run at a high speed, a fuel in a tank 3, that is, gasoline is burned mainly within an engine 2 in order to rotate the driving wheels 6. At such a time, a motor/generator 4 functions as a generator using the rotary energy of the engine 2 so as to charge the battery 5. On the other hand, when the PHV is run at a low speed in an urban area or the like, the motor/generator 4 functions as a motor using the battery 5 as an energy source. Therefore, the PHV 1 is run mainly as an electric motorcar.

The PHV 1 includes a door locking mechanism 10, and a connector locking mechanism 20 and a cover locking mechanism 30 which constitute a charging locking mechanism. Moreover, a PHV electronic control unit (ECU) 100 can act as a control means that outputs a control signal to each of the mechanisms 10, 20, and 30 according to an inputting manipulation performed on a key 40 comparable to a door locking command input means is mounted in the PHV 1. Incidentally, the key 40 may be a mechanical key, an electronic key, or bidirectional handheld equipment.

The door locking mechanism 10 includes a power lock structure composed of a door locking motor 11 comparable to a door locking driving means, and a door locking lever 12. The door locking mechanism 10 acts to switch from a locked state, in which the door 7 of the PHV 1 for boarding is closed and locked, to an unlocked state in which the door 7 for boarding is unlocked or vice versa. Specifically, based on an inputting manipulation performed on the key 40, a signal is inputted from a door key sensor 7a to the PHV ECU 100, and the PHV ECU 100 issues a switching command to the door locking mechanism 10 that instructs switching between the locked state and unlocked state.

The connector locking mechanism 20 also includes a power lock structure composed of a connector locking motor 21 comparable to a connector locking driving means and a rack-and-pinion mechanism 22 or the like. When a connecting part 5a of the battery 5 is connected to an alternating current (AC) power supply V over a charging cable 23, the connector locking mechanism 20 acts to switch from a locked state, in which a cable connector 23a of the charging cable 23 is inserted into and held in a vehicle-side receptacle 5b, to an unlocked state, in which the cable connector 23a can be pulled out of the vehicle-side receptacle 5b, or vice versa. Incidentally, reference numeral 5c denotes a cable sensor that detects whether the cable connector 23a or charging cable 23 has been inserted into or attached to the vehicle-side receptacle 5b. Reference numeral 23b denotes an AC to direct current (DC) (AC-DC) converter attached to the charging cable 23.

The cover locking mechanism 30 also includes a power lock structure composed of a cover locking motor 31 comparable to a cover locking driving means, and a rack-and-pinion mechanism 32 or the like. When the connecting part 5a of the battery 5 is connected to the ac power supply V over the charging cable 23, the cover locking mechanism 30 acts to switch from a locked state, in which a receptacle cover 33 externally shielding the vehicle-side receptacle 5b is closed and locked, to an unlocked state, in which the receptacle cover 33 is unlocked, or vice versa.

Further, in an instrument panel 8 of the PHV 1, a charging switch 8a to be used to start the charging system or PHV ECU 100, a key switch 8b to be used to start the engine 2, a charging lamp 8c indicating the progress of charging of whether charging is completed or under way, and an alarm lamp 8d that outputs an alarm according to the result of detection by the cable sensor 5c are disposed.

Figure 2:
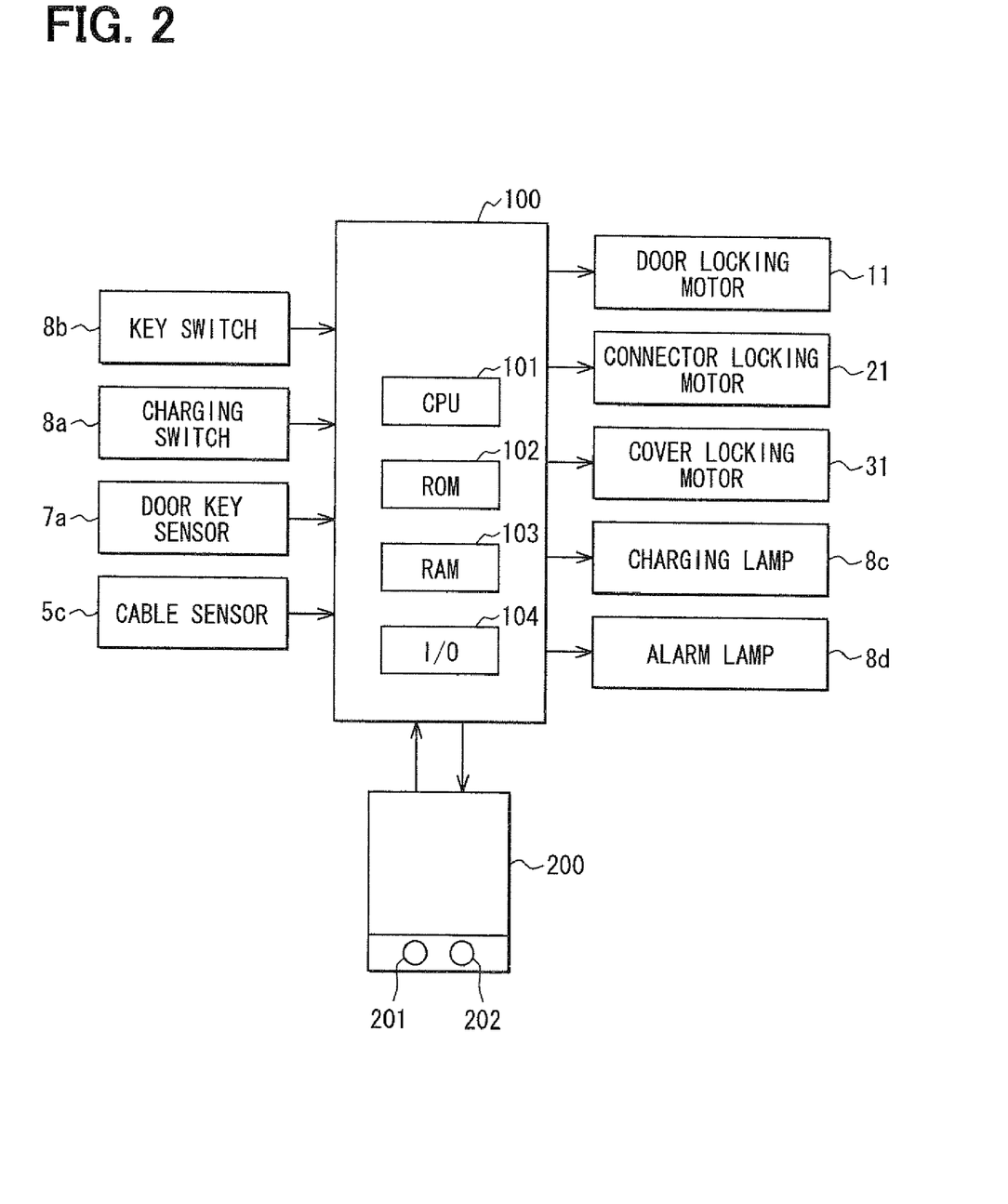
FIG. 2 is a block diagram illustrating an exemplary electrical construction of a charging system as shown in an embodiment of FIG. 1.

The bock diagram of FIG. 2 schematically shows the electric construction of the charging system shown in FIG. 1. The PHV ECU 100 includes a central processing unit (CPU) 101, which can be a processor such as, for example, an arithmetic unit or the like, a read-only memory (ROM) 102 in which programs can be stored, a random access memory (RAM) 103, which is readable and rewritable and in which a work area and various counters are allocated, and an input/output (I/O) interface 104, all of which are interconnected over a bus (not shown).

Signals sent from the key switch 8b and charging switch 8a which are disposed in the instrument panel 8, the door key sensor 7a disposed in the door 7 for boarding, and the cable sensor 5c disposed in the vehicle-side receptacle 5b are inputted to the PHV ECU 100.

The PHV ECU 100 controls driving of the door locking motor 11 included in the door locking mechanism 10, the connector locking motor 21 included in the connector locking mechanism 20, and the cover locking motor 31 included in the cover locking mechanism 30.

Figure 3:
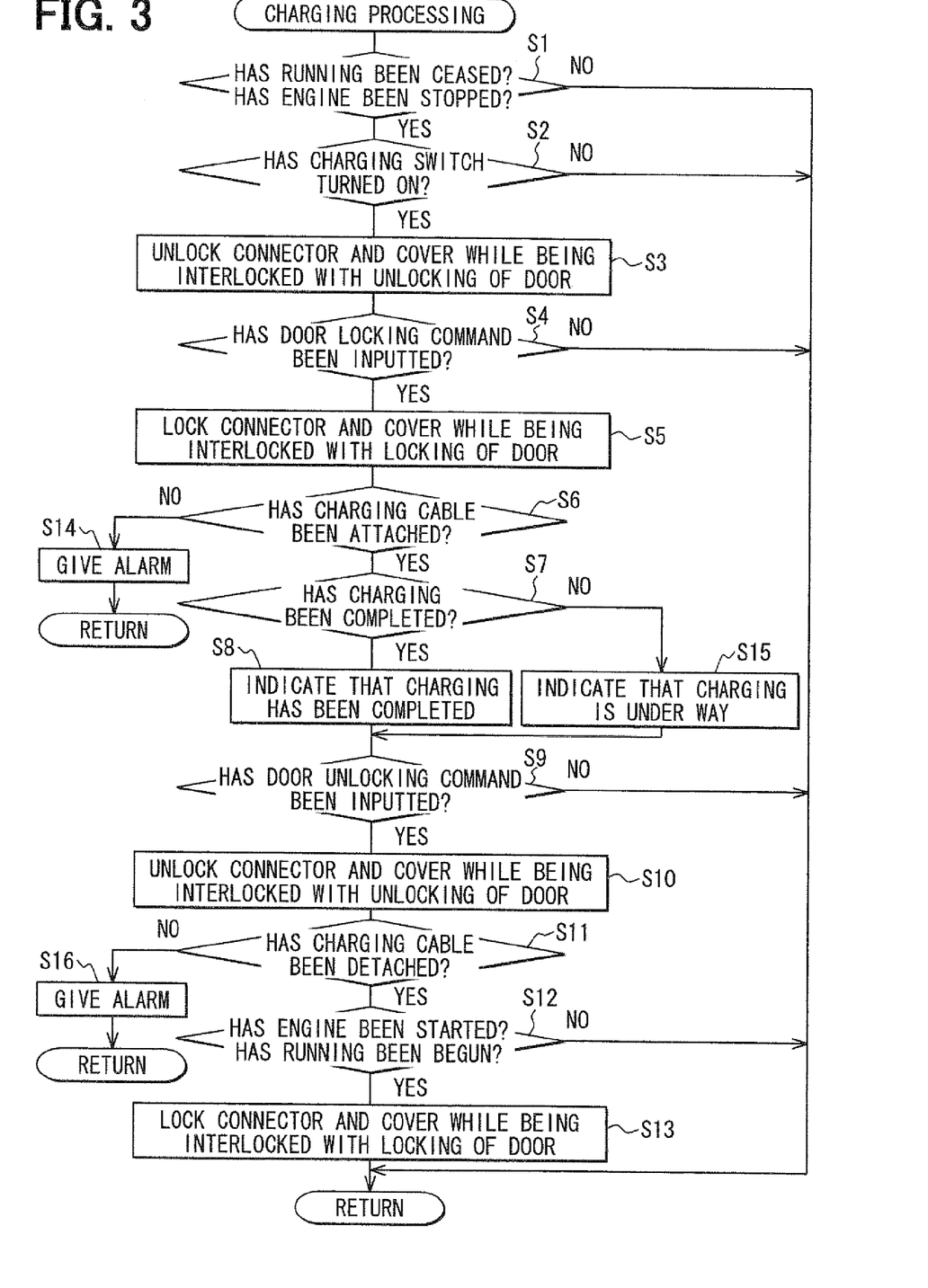
FIG. 3 is a flowchart illustrating an exemplary charging processing.

Next, control to be implemented by the PHV ECU 100 will be described in conjunction with the flowchart of charging processing of FIG. 3.

After starting the charging processing, it is determined whether the running of the PHV 1 has been ceased and the engine 2 has been stopped based on, for example, whether the key 40 has been pulled out of the key switch 8*b*. If the key 40 has been pulsed out of the key switch 8*b* and the running is ceased and the engine stopped, corresponding to YES at S1, processing proceeds to S2 where it is determined whether the charging switch 8*a* has been depressed or otherwise activated or "turned on." If the charging switch 8*a* has been depressed or otherwise activated, corresponding to YES at S2, the door locking motor 11 is driven in order to unlock the door locking mechanism 10 at S3. In the manner interlocked with the driving and unlocking, the connector motor 21 and cover motor 31 are driven in order to unlock the connector locking mechanism 20 and cover locking mechanism 30. Thereafter, it is determined whether a door locking command has been inputted, that is, whether a door locking signal sent from the key 40 or door key sensor 7*a* has been inputted. If the door locking signal has been inputted, corresponding to YES at S4, the door locking motor 11 is driven in order to lock the door locking mechanism 10 at S5. Further, in the manner interlocked with the driving and locking, the connector motor 21 and cover motor 31 are driven in order to lock the connector locking mechanism 20 and cover locking mechanism 30 at S5.

It is then determined whether the charging cable 23 or cable connector 23*a* has been inserted into the vehicle-side receptacle 5*b* based on whether a signal has been inputted from the cable sensor 5*c*. If the charging cable has been inserted, corresponding to YES at S6, processing proceeds to S7 where it is determined whether charging has been completed. If charging has been completed, corresponding to YES at S7, the charging lamp 8*c* is caused to indicate that charging has been completed, for example, the charging lamp 8*c* is flickered at S8. If charging is still under way, that is, charging is not completed, corresponding to NO at S7, the charging lamp 3*c* is caused to indicate that charging is still under way at S15, by, for example, maintaining a constant lighting of the charging lamp 3*c*. If the charging cable 23 has not been inserted or otherwise attached, corresponding to NO at S6, an alarm providing a notification of non-attachment of the cable is provided at S14. It will be understood that the notification can mean, for example, that the charging cable 23 has been imperfectly inserted. An alarm condition signifying that the alarm lamp 8*d* should be lit, for example, in red is outputted to the alarm lamp 8*d* at S14. Charging processing is then terminated.

It is then determined whether a door unlocking command been inputted, that is, whether a door unlocking command is sent from the key 40 or door key sensor 7*a* has been inputted at S9. If the door unlocking signal has been inputted, corresponding to YES S9, the door locking motor 11 is driven in order to unlock the door locking mechanism 10. In the manner interlocked with the driving and unlocking, the connector motor 21 and cover motor 31 are driven in order to unlock the connector locking mechanism 20 and cover locking mechanism 30 at S10.

It is then decided whether the charging cable 23 or cable connector 23*a* has been detached, that is, pulled out of the vehicle-side receptacle 5*b*, based on whether a signal has been inputted from the cable sensor 5*c*, at S11. If the charging cable 23 has been detached or otherwise pulled out, corresponding to YES at S11, it is determined at S12 whether the engine 2 has been started and the running of the PHV 1 has been begun by checking whether the key 40 has been inserted into the key switch 8*b* and moved to an engine start position. If the engine has been started and running has begun, that is if key 40 has been inserted into the key switch 8*b*, corresponding to YES at S12, the door locking motor 11 is driven in order to lock the door locking mechanism 10. In the manner interlocked with the driving and locking, the connector motor 21 and cover motor 31 are driven in order to lock the connector locking mechanism 20 and cover locking mechanism 30 at S13. The charging processing is then terminated.

If the charging cable 23 has not been detached, corresponding to NO at S11, an alarm providing a notification of the non-detachment of the charging cable 23 is provided at S16. It will be understood that the non-detachment can mean that the charging cable 23 has imperfectly been pulled out. An alarm condition signifying that the alarm lamp 3*d* should be lit, for example, in blue is outputted to the alarm lamp 3*d* at S16. The charging processing is then terminated.

Moreover, if any of the following conditions are satisfied, that is if the key 40 has not been pulled out of the key switch 8*b*, corresponding to NO at S1, if the charging switch 8*a* has not been depressed, corresponding to NO at S2, if the door locking signal has not been inputted, corresponding to NO at S4, if the door unlocking signal has not been inputted, corresponding to NO at S9, or if the key 40 has not been inserted into the key switch 8*b*, corresponding to NO at S12, the charging processing is immediately terminated.

The cable connector 23*a* of the charging cable 23 is opposed to the vehicle-side receptacle 5*b* in the connecting part 5*a* in order to prepare for charging. When an occupant leaves the PHV 1, a switching command of switching from the unlocked state of the door locking mechanism 10 to the locked state thereof is inputted to the PHV ECU 100 responsive to an inputting manipulation performed on the key 40 or door key sensor 7*a*. The PHV ECU 100 allows the door locking mechanism 10 to act to switch from the unlocked state to the locked state, and allows the connector locking mechanism 20 and cover locking mechanism 30 to act to switch from the unlocked states to the locked states in the manner interlocked with the switching action of the door locking mechanism.

When the occupant boards the PHV 1, a switching command of switching from the locked state of the door locking mechanism 10 to the unlocked state is inputted to the PHV ECU 100 responsive to an inserting manipulation performed on the key 40 or door key sensor 7*a*. The PHV ECU 100 allows the door locking mechanism 10 to act to switch from the locked state to the unlocked state, and allows the connector locking mechanism 20 and cover locking mechanism 30 to act to switch from the locked states to the unlocked states in the manner interlocked with the switching action of the door locking mechanism. Therefore, after charging the battery 5 is completed, the charging cable 23 can be stowed or otherwise put away.

Figure 4A:
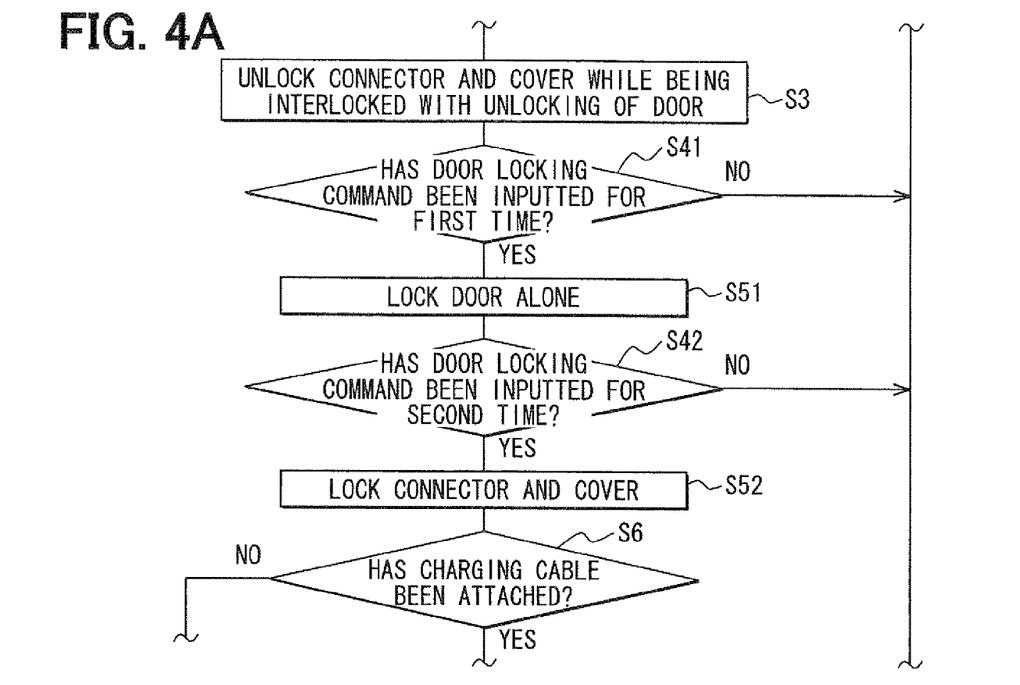
FIG. 4A and FIG. 4B are flowcharts illustrating other examples of charging processing.

Consequently, even when the battery 5 of the PHV 1 is charged from the household power supply V at night or during vehicle down-time, incidents such as the theft of the charging cable 23, insertion of foreign matter into the vehicle-side receptacle 5*b*, or tampering with any other component can be effectively prevented. Moreover, the switching action of the connector locking mechanism 20 or cover locking mechanism 30 between locking and unlocking is performed in the same direction as the direction from the occupant to the PHV 1 in which the switching command of switching locking of the door locking mechanism 10 and unlocking thereof is normally issued. Such a security feature can be readily provided without the necessity of a time-consuming manipulation or a complex construction, Second Embodiment FIG. 4A and FIG. 4B are flowcharts describing other examples of charging processing and presenting modified parts of the charging processing described in FIG. 3. In FIG. 4A, it is determined whether the door locking command, that is, the door locking signal sent from the key 40 or door key sensor 7a has been inputted for the first time at S41. If the door locking signal has been inputted for the first time, corresponding to YES at S41, the door locking motor 11 is driven in order to lock the door locking mechanism 10 alone at S51. Thereafter, it is determined whether the door locking command has been inputted for the second time, that is, the door locking signal sent from the key 40 or door key sensor 7a, at S42. If the door locking signal has been inputted for the second time, corresponding to YES at S42, the connector motor 21 and cover motor 32 are driven at S52 in order to lock the connector locking mechanism 20 and cover locking mechanism 30 in the same manner as when the door locking signal has been inputted for the first time. Thereafter, the processing resumes in accordance with, for example, S6 as described in connection with FIG. 3.

Figure 4B:
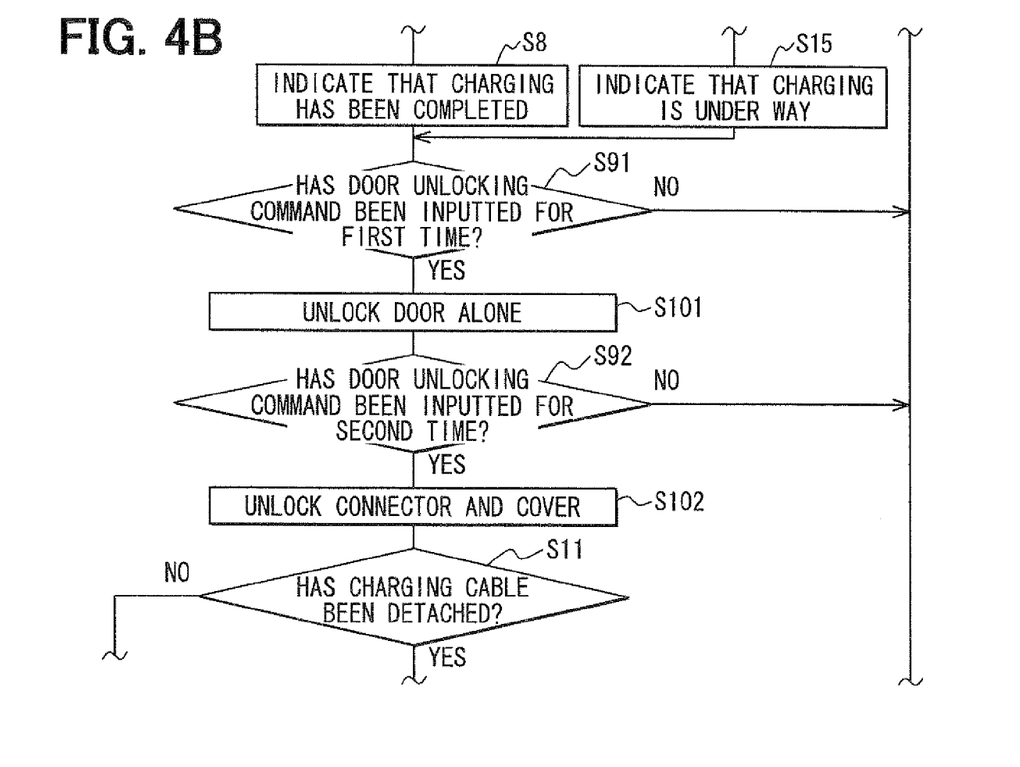

Referring to FIG. 4B, it is determined whether the door unlocking command has been inputted for the first time, that is, the door unlocking signal sent from the key 40 or door key sensor 7a at S91. If the door unlocking signal has been inputted for the first time, corresponding to YES at S91, the door locking motor 11 is driven so as to unlock the door locking mechanism 10 alone at S101. Thereafter, it is determined whether the door unlocking command has been inputted for the second time, that is, the door unlocking signal sent from the key 40 or door key sensor 7a, at S92. If the door unlocking signal has been inputted for the second time, corresponding to YES at S92, the connector motor 21 and cover motor 31 are driven at S102 to unlock the connector locking mechanism 20 and cover locking mechanism 30 in the same manner as that when the door unlocking signal has been inputted for the first time. Thereafter, the processing resumes in accordance with, for example, S11 as described in connection with FIG. 3.

Based on the number of times by which the switching command of switching locking of the door locking mechanism 10 and unlocking thereof is sent from the key 40 or door key sensor 7a, interlock with the switching action of the connector locking mechanism 20 or cover locking mechanism 30 between locking and unlocking is controlled stepwise. Consequently, the occupant can perform the next inputting manipulation on the key 40 or door key sensor 7a while stepwise checking the progress of the switching action of the door locking mechanism 10, connector locking mechanism 20, or cover locking mechanism 30. Therefore, an incorrect action of any of the mechanisms 10, 20, and 30 can be discovered in an early stage and damage can be prevented.

In the present embodiment, the relationship of interlock of the switching action of the connector locking mechanism 20 or cover locking mechanism 30 to the switching manipulation performed on the key 40 or door key sensor 7a can be designated or customized. The relationship of interlock can be, as shown in FIG. 2, selected from the contents of designation or selection displayed on a navigation screen 200 by turning on a designation button 201, and designated through selective input performed using a selective input button 202 comparable to a selective input means.

Figure 5:
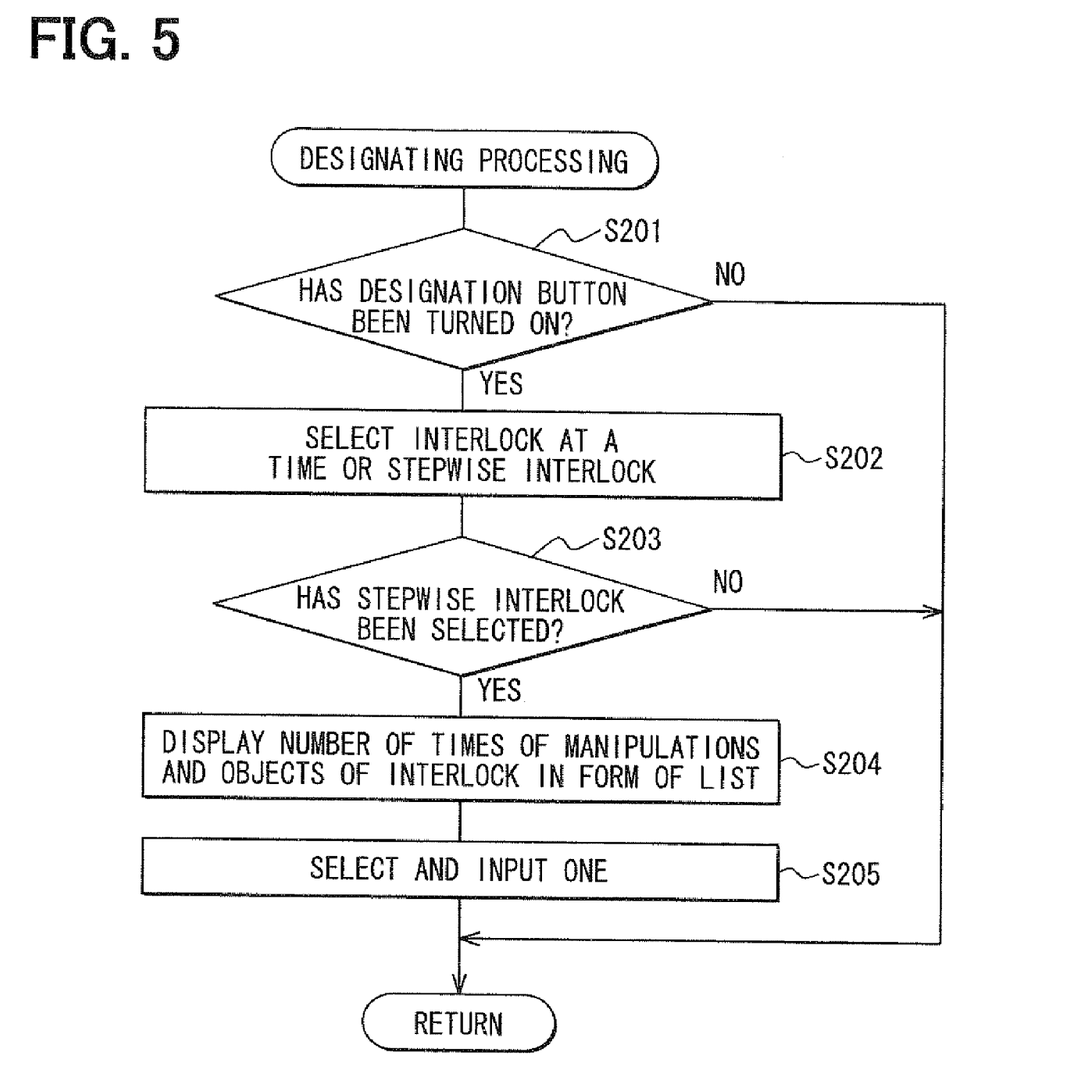
FIG. 5 is a flowchart illustrating an exemplary designating processing that can succeed charging processing as shown in an embodiment of FIG. 4.

FIG. 5 is a flowchart presenting one example of designating processing succeeding the processing mentioned in FIG. 4. If the designation button 201 is turned on, corresponding to YES at S201, a message saying, for example, "Do you want to engage switching interlock?" is displayed as an initial selection screen image on the navigation screen 200, as shown in FIG. 2, at S202. The message can refer to whether the user desires to have the interlock of the switching action of the door locking mechanism 10 with the switching actions of the connector locking mechanism 20 and cover locking mechanism 30 controlled at a time in a first control mode or controlled stepwise in a second control mode according to a manipulation of switching the key 40 or door key sensor 7a from one state to another. If the selective input button 202 is used to select, for example, "Stepwise Interlock" from the interlock control modes and input it, corresponding to YES at S203, the number of times by which the key 40 or door key sensor 7a is manipulated and the relationships of interlock to objects of interlock, that is, the connector locking mechanism 20 and cover locking mechanism 30 are displayed in the form of a list at S204. A desired relationship of interlock is selected from the relationships of interlock and inputted using the selective input button 202 at S205. The designating processing is then terminated. If the designation button 201 is not turned on, corresponding to NO at S201, or if "Stepwise Interlock" is not selected and inputted, or, "Interlock at a Time" is selected and inputted, corresponding to NO at S203, the designating processing is terminated.

Consequently, a charging system modified or customized in line with the wishes of an occupant can be constructed. For example, the action of the door locking mechanism 10 alone may be controlled responsive to the first input of a signal from the key 40 or door key sensor 7a. The action of the connector locking mechanism 20 alone may be controlled responsive to the second input of the signal, in the same manner as that performed responsive to the first input of the signal. The action of the cover locking mechanism 30 alone may be controlled responsive to the third input of the signal, in the same manner as those performed responsive to the first and second inputs of the signal.

(Variant)

Figure 6A:
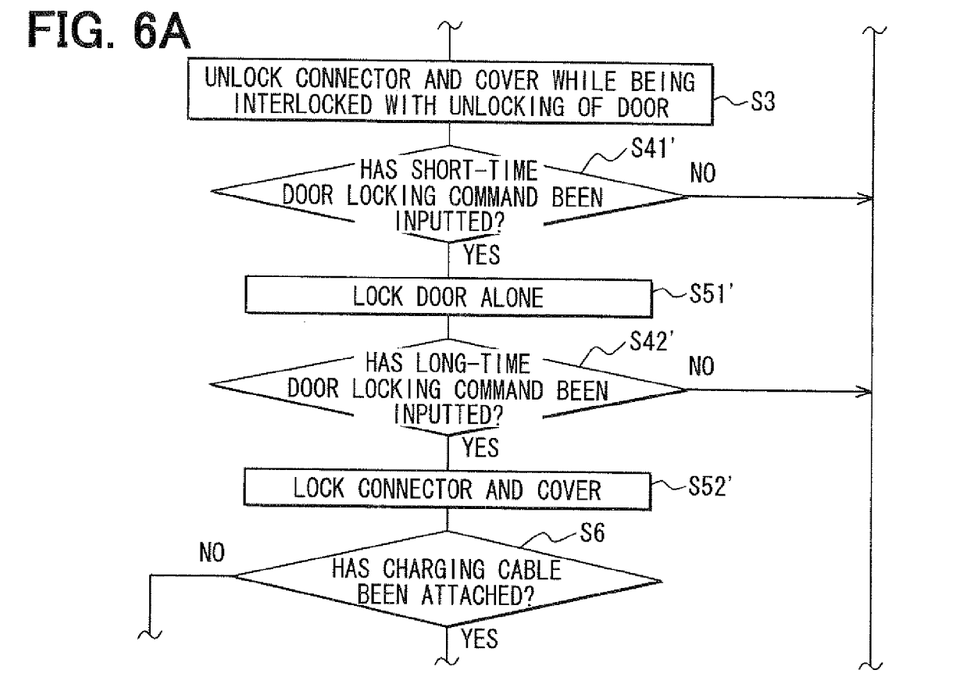
FIG. 6A and FIG. 6B are flowcharts illustrating variants of exemplary charging processing as shown in an embodiment of FIG. 4.
Figure 6B:
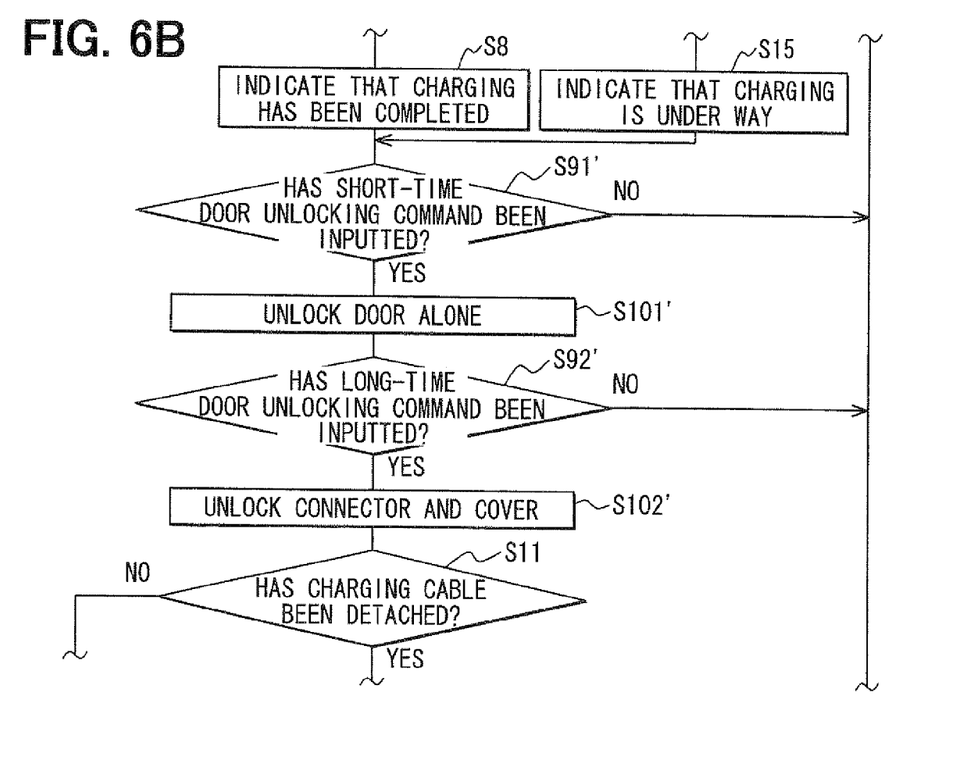

FIG. 6A and FIG. 6B are flowcharts showing a variant of the charging processing described in connection with FIG. 4. It should be noted that FIG. 6A and FIG. 6B present only modified parts of the processing mentioned in FIG. 4. Referring to FIG. 6A, it is determined at S41' whether a short-time door locking command has been inputted, that is, whether a door locking signal has been sent from the key 40 or door key sensor 7a and whether the signal persists for a short time, for example, one second or less. If the short-time door locking signal has been inputted, corresponding to YES at S41', the door locking motor 11 is driven in order to lock the door locking mechanism 10 alone at S51'. Thereafter, it is determined at S42' whether a long-time door locking command has been inputted, that is, whether a door locking signal has been sent from the key 40 or door key sensor 7a and whether the signal persists for a long time, for example, a time longer than one second. If the long-time door locking signal has been inputted, corresponding to YES at S42', the connector motor 21 and cover motor 31 are driven in order to lock the connector locking mechanism 20 and cover locking mechanism 30 at S52' in the same manner as that when the short-time door locking signal has been inputted.

Referring to FIG. 6B, it is determined at S91' whether a short-time door unlocking command has been inputted, that is, whether a door unlocking signal has been sent from the key 40 or door key sensor 7a and whether the signal persists for a short time, for example, one second or less. If the short-time door unlocking signal has been inputted, corresponding to YES at S91', the door locking motor 11 is driven in order to unlock the door locking mechanism 10 alone at S101'. Thereafter, it is determined at S92' whether a long-time door unlocking command has been inputted, that is, whether a door unlocking signal has been sent from the key 40 or door key sensor 7a and whether the signal persists for a long time, for example, a time longer than one second. If the long-time door unlocking signal has been inputted, corresponding to YES at S92', the connector motor 21 and cover motor 31 are driven in order to unlock the connector locking mechanism 20 and cover locking mechanism 30 at S102' in the same manner as that when the short-time door unlocking signal has been inputted.

Based on the manipulation time during which the switching command of switching locking of the door locking mechanism 10 and unlocking thereof is sent from the key 40 or door key sensor 7a, interlock with the switching action of the connector locking mechanism 20 or cover locking mechanism 30 between locking and unlocking can be controlled stepwise. Consequently, an occupant can perform the next inputting manipulation on the key 40 or door key sensor 7a while stepwise checking the progress of the switching action of the door locking mechanism 10, connector locking mechanism 20, or cover locking mechanism 30. An incorrect action of any of the mechanisms 10, 20, and 30 can be discovered in an early stage, and damage can be prevented. Even in this variant, the same designating processing as that mentioned in FIG. 5 or that employed in the embodiment 2 can be performed.

It should be noted that the embodiments and variant have been described on the assumption that the charging system is mounted in a PHV. Alternatively, the charging system may be mounted in an HV or an EV.

What is claimed is:

1. A charging system for a vehicle using an onboard battery for running power, the charging system comprising:
    a door locking mechanism that switches between a door locked state, in which a door of the vehicle is closed and locked, and a door unlocked state, in which the door for boarding is unlocked;
    a charging locking mechanism that switches from a charging locked state, in which the charging cable is attached to a vehicle-side receptacle in order to enable charging, to a charging unlocked state, in which the charging cable is detached from the vehicle-side receptacle in order to suspend charging, when the onboard battery and an alternating-current (AC) power supply are disconnected from each other using a charging cable and that switches from the charging unlocked state to the charging locked state when the onboard battery and the AC power supply are connected with each other using the charging cable; and
    an interlocked locking controller that causes the charging locking mechanism to switch from the charging unlocked state to the charging locked state in response to a switching command of switching from the door unlocked state to the door locked state when an occupant leaves the vehicle, and that causes the charging locking mechanism to act to switch from the charging locked state to the charging unlocked state in response to a switching command of switching from the door locked state to the door unlocked state when the occupant boards the vehicle; wherein:
    the charging locking mechanism includes:
        a connector locking mechanism that switches between a connector locked state, in which a cable connector of the charging cable is inserted into and held in the vehicle-side receptacle, and a connector unlocked state, in which the cable connector is pulled out of the vehicle-side receptacle; and
        a cover locking mechanism that switches between a cover locked state, in which a receptacle cover externally shielding the vehicle-side receptacle is closed and locked, to a cover unlocked state, in which the receptacle cover is unlocked; and
    when the occupant leaves the vehicle, the interlocked locking controller causes at least one of the connector locking mechanism and the cover locking mechanism to switch from a first corresponding at least one of the connector unlocked state and the cover unlocked state to a second corresponding at least one of the connector locked state and the cover locked state in response to the switching command of switching from the door unlocked state to the door locked state; and
    the door locking mechanism is an intelligent key or a smart key.

2. The charging system for vehicles according to claim 1, wherein:
    the interlocked locking controller includes a key switch that is manipulated in order to manually input the switching command of switching between the door locked state and the door unlocked state;
    when the key switch is used to input an initial command which instructs the door locking mechanism to switch from the door locked state to the door unlocked state, the interlocked locking controller causes the door locking mechanism alone to perform the switching action;
    when the key switch is used to input a successive command having the same contents as the initial command, the interlocked locking controller causes at least one of the connector locking mechanism and cover locking mechanism to perform the switching action; and
    the switching action of the door locking mechanism and the switching action of the at least one of the connector locking mechanism and the cover locking mechanism are performed in a stepwise manner.

3. The charging system for vehicles according to claim 2, wherein the interlocked locking controller includes a selective input device that is used externally to selectively input a first control mode in which interlock of the switching action of the door locking mechanism with the switching action of the at least one of the connector locking mechanism and the cover locking mechanism is controlled at a time in response to the switching command inputted using the key switch, and a second control mode in which the interlock is controlled in a stepwise manner in response to the switching command inputted using the key switch.

4. The charging system for a vehicle according to claim 2, wherein, when the occupant leaves the vehicle, the interlocked locking controller causes both of the connector locking mechanism and the cover locking mechanism to switch from a first corresponding to both of the connector unlocked state and the cover unlocked state to a second corresponding to both of the connector locked state and the cover locked state in response to the switching command of switching from the door unlocked state to the door locked state.

5. The charging system for vehicles according to claim 1, wherein:
    the interlocked locking controller includes a key switch that is manipulated in order to manually input the switching command of switching between the door locked state and the door unlocked state;

when the key switch is used to input a command which instructs the door locking mechanism to switch from the door locked state to the door unlocked state, the command persisting for a predetermined time or less, the interlocked locking controller allows the door locking mechanism alone to perform the switching action;

when the key switch is used to input a command that persists for a time longer than the predetermined time, the interlocked locking controller causes at least one of the connector locking mechanism and cover locking mechanism to perform the switching action; and the switching action of the door locking mechanism and the switching action of the at least one of the connector locking mechanism and the cover locking mechanism are performed in a stepwise manner.

6. The charging system for vehicles according to claim 5, wherein the interlocked locking controller includes a selective input device that is used externally to selectively input a first control mode in which interlock of the switching action of the door locking mechanism with the switching action of the at least one of the connector locking mechanism and the cover locking mechanism is controlled at a time in response to the switching command inputted using the key switch, and a second control mode in which the interlock is controlled in a stepwise manner in response to the switching command inputted using the key switch.

7. The charging system for vehicles according to claim 1, wherein when the occupant boards the vehicle, the interlocked locking controller causes at least one of the connector locking mechanism and cover locking mechanism to switch from a first corresponding at least one of the connector locked state and the cover locked state to a second corresponding at least one of the connector unlocked state and the cover unlocked state in response to the switching command of switching from the door locked state to the door unlocked state.

8. A charging system for a vehicle using an onboard battery for running power, the charging system comprising:
   a door locking mechanism that switches between a door locked state, in which a door of the vehicle is closed and locked, and a door unlocked state, in which the door for boarding is unlocked;
   a charging locking mechanism that switches from a charging locked state, in which the charging cable is attached to a vehicle-side receptacle in order to enable charging, to a charging unlocked state, in which the charging cable is detached from the vehicle-side receptacle in order to suspend charging, when the onboard battery and an alternating-current (AC) power supply are disconnected from each other using a charging cable and that switches from the charging unlocked state to the charging locked state when the onboard battery and the AC power supply are connected with each other using the charging cable; and
   an interlocked locking controller that causes the charging locking mechanism to switch from the charging unlocked state to the charging locked state in response to a switching command of switching from the door unlocked state to the door locked state when an occupant leaves the vehicle, and that causes the charging locking mechanism to act to switch from the charging locked state to the charging unlocked state in response to a switching command of switching from the door locked state to the door unlocked state when the occupant boards the vehicle; wherein:
   the charging locking mechanism includes:
      a connector locking mechanism that switches between a connector locked state, in which a cable connector of the charging cable is inserted into and held in the vehicle-side receptacle, and a connector unlocked state, in which the cable connector is pulled out of the vehicle-side receptacle; and
      a cover locking mechanism that switches between a cover locked state, in which a receptacle cover externally shielding the vehicle-side receptacle is closed and locked, to a cover unlocked state, in which the receptacle cover is unlocked; and
   when the occupant boards the vehicle, the interlocked locking controller causes at least one of the connector locking mechanism and cover locking mechanism to switch from a first corresponding at least one of the connector locked state and the cover locked state to a second corresponding at least one of the connector unlocked state and the cover unlocked state in response to the switching command of switching from the door locked state to the door unlocked state; and
   the door locking mechanism is an intelligent key or a smart key.

9. The charging system for vehicles according to claim 8, wherein:
   the interlocked locking controller includes a key switch that is manipulated in order to manually input the switching command of switching between the door locked state and the door unlocked state;
   when the key switch is used to input an initial command which instructs the door locking mechanism to switch from the door locked state to the door unlocked state, the interlocked locking controller causes the door locking mechanism alone to perform the switching action;
   when the key switch is used to input a successive command having the same contents as the initial command, the interlocked locking controller causes at least one of the connector locking mechanism and cover locking mechanism to perform the switching action; and
   the switching action of the door locking mechanism and the switching action of the at least one of the connector locking mechanism and the cover locking mechanism are performed in a stepwise manner.

10. The charging system for vehicles according to claim 9, wherein the interlocked locking controller includes a selective input device that is used externally to selectively input a first control mode in which interlock of the switching action of the door locking mechanism with the switching action of the at least one of the connector locking mechanism and the cover locking mechanism is controlled at a time in response to the switching command inputted using the key switch, and a second control mode in which the interlock is controlled in a stepwise manner in response to the switching command inputted using the key switch.

11. The charging system for vehicles according to claim 8, wherein:
   the interlocked locking controller includes a key switch that is manipulated in order to manually input the switching command of switching between the door locked state and the door unlocked state;
   when the key switch is used to input a command which instructs the door locking mechanism to switch from the door locked state to the door unlocked state, the command persisting for a predetermined time or less, the interlocked locking controller allows the door locking mechanism alone to perform the switching action;

when the key switch is used to input a command that persists for a time longer than the predetermined time, the interlocked locking controller causes at least one of the connector locking mechanism and cover locking mechanism to perform the switching action; and the switching action of the door locking mechanism and the switching action of the at least one of the connector locking mechanism and the cover locking mechanism are performed in a stepwise manner.

12. The charging system for vehicles according to claim 11, wherein the interlocked locking controller includes a selective input device that is used externally to selectively input a first control mode in which interlock of the switching action of the door locking mechanism with the switching action of the at least one of the connector locking mechanism and the cover locking mechanism is controlled at a time in response to the switching command inputted using the key switch, and a second control mode in which the interlock is controlled in a stepwise manner in response to the switching command inputted using the key switch.

13. The charging system for a vehicle according to claim 8, wherein, when the occupant boards the vehicle, the interlocked locking controller causes both of the connector locking mechanism and cover locking mechanism to switch from a first corresponding to both of the connector locked state and the cover locked state to a second corresponding to both of the connector unlocked state and the cover unlocked state in response to the switching command of switching from the door locked state to the door unlocked state.

\* \* \* \* \*